(12) United States Patent
Shipps et al.

(10) Patent No.: US 7,224,640 B2
(45) Date of Patent: May 29, 2007

(54) UNDERWATER ACOUSTIC BEARING SENSOR

(75) Inventors: J. Clay Shipps, Baltimore, MD (US); Hikmet Andic, Baltimore, MD (US)

(73) Assignee: Wilcoxon Research, Inc, Gaithersburg, MD (US)

( * ) Notice: Subject to any disclaimer, the term of this patent is extended or adjusted under 35 U.S.C. 154(b) by 0 days.

(21) Appl. No.: 11/209,723

(22) Filed: Aug. 24, 2005

(65) Prior Publication Data

US 2006/0044938 A1 Mar. 2, 2006

Related U.S. Application Data

(60) Provisional application No. 60/603,556, filed on Aug. 24, 2004.

(51) Int. Cl.
*H04B 17/00* (2006.01)

(52) U.S. Cl. .......................................... 367/13; 367/12
(58) Field of Classification Search .................. 367/12, 367/13
See application file for complete search history.

(56) References Cited

U.S. PATENT DOCUMENTS

2003/0117025 A1* 6/2003 Rouquette .................... 307/147
2006/0044938 A1* 3/2006 Shipps et al. ................. 367/13

* cited by examiner

*Primary Examiner*—Dan Pihulic
(74) *Attorney, Agent, or Firm*—Paul Davis; Heller Ehrman LLP

(57) ABSTRACT

In an underwater acoustic bearing sensor, the vector sensor, heading sensor, and pitch and roll sensor are held in a common mounting ring to ensure that their coordinate systems are collinear. The vector sensor includes x, y, and z accelerometers mounted in the ring and a hydrophone that can be mounted independently.

6 Claims, 2 Drawing Sheets

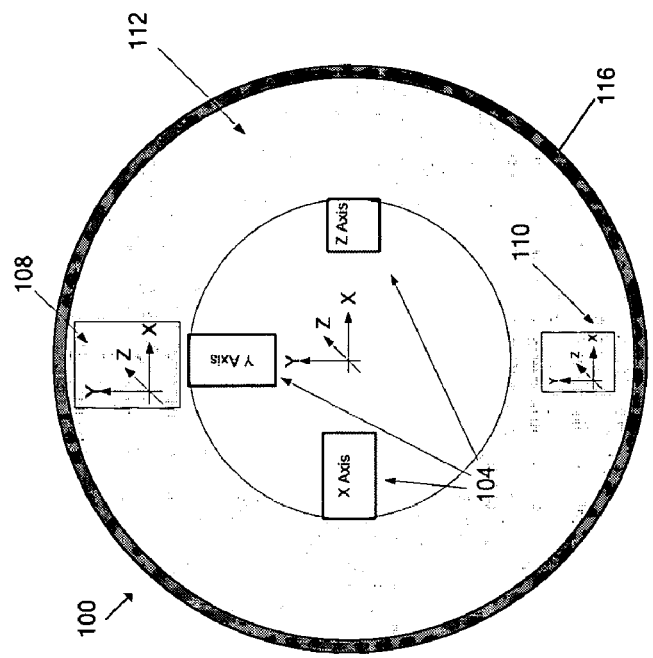
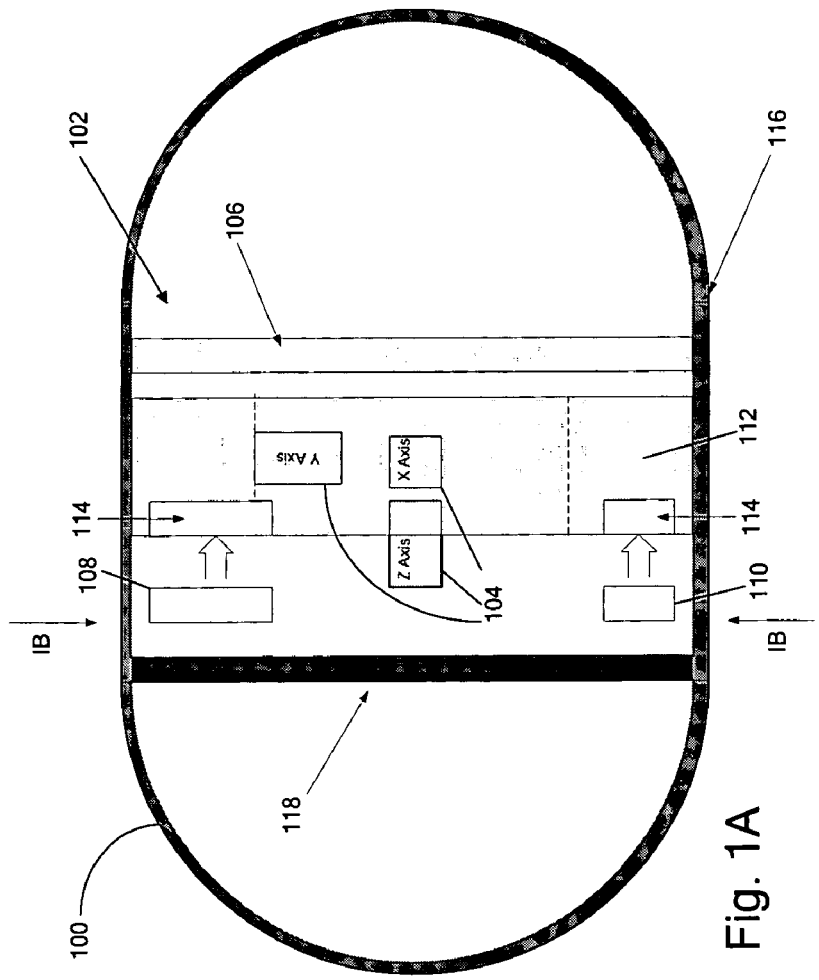
Fig. 1A
Fig. 1B

UNDERWATER ACOUSTIC BEARING SENSOR

REFERENCE TO RELATED APPLICATION

The present application claims the benefit of U.S. Provisional Patent Application No. 60/603,556, filed Aug. 24, 2004, whose disclosure is hereby incorporated by reference in its entirety into the present disclosure.

FIELD OF THE INVENTION

The present invention is directed to an underwater bearing sensor and more specifically to an underwater bearing sensor that can correct itself for changes in orientation over time.

DESCRIPTION OF RELATED ART

A vector sensor is the combination of an accelerometer(s) with an omni-directional hydrophone. The hydrophone measures acoustic pressure in the water while the accelerometer(s) measure the acoustic particle velocity. The pressure is a scalar quantity but the particle velocity is a "vector" quantity which provides directional information.

A vector sensor can use up to three accelerometers depending on the application. A vector sensor by itself is a very accurate directional sensor that can pinpoint the bearing of a noise source relative to its acoustic center. Unfortunately, if the orientation of the vector sensor is not known in reference to an "absolute origin", such as the earth's surface, then the exact bearing of the noise source can only be known in reference to the vector sensor itself but not to the "absolute origin". To operate properly and to sense the acoustic particle velocity, a vector sensor must be able to float freely in a neutrally buoyant state. Therefore, it cannot be hard mounted or rigidly fixed in its applications.

In most cases a series of vector sensors are wrapped in open cell foam and installed in oil filled array hoses. In this configuration they are relatively free floating and can therefore change their orientation relative to the array over time when the array is transported, deployed, retrieved, or towed. When this happens, the initial orientation "calibration" of the sensor, conducted after the sensors are installed, becomes invalid. The errors in the orientation of the individual sensors in the array lead to errors in the analysis of the acoustic data and the exact bearing determination.

Most arrays have pitch and roll sensors as well as heading sensors embedded in the array to provide the orientation of the array. Unfortunately, they are typically fixed or hard mounted to the structure of the array whereas the vector sensors are not. Therefore, if the vector sensors move within the array, the information from the orientation sensors is not correlated with the acoustic information from the vector sensor.

Sometimes orientation sensors are sparsely spaced throughout an array to provide a better estimation of the orientation of the sensors within the array. The sparseness of the pitch and roll and heading sensors within the array, however, cause the data collection analyst to have to interpolate between each of the pitch and roll and heading sensors to find the estimated orientation of the vector sensors. This too, causes errors in the analysis of the acoustic data and causes the exact bearing estimate to be flawed.

SUMMARY OF THE INVENTION

It is therefore an object of the invention to overcome the above-noted deficiencies of the prior art.

To achieve the above and other objects, the present invention is directed an underwater acoustic bearing sensor that combines the directional (acoustical) capabilities of a vector sensor with the directional (orientational) capabilities of a heading sensor and a pitch and roll sensor. This is accomplished by closely aligning the acoustic sensing axis of the vector sensor with the orientation axis of the pitch and roll and heading sensors. Mechanically this is achieved by assembling all three sensors onto a common mounting structure within the housing of the underwater acoustic bearing sensor.

Three sensors are incorporated into one underwater acoustic bearing sensor. The three sensors are 1) a vector sensor, 2) a heading sensor, and 3) a pitch and roll sensor. The objective of an underwater "detection" device is to be able to detect and pinpoint the bearing and location of a detected noise source. To accomplish this, a directional acoustic receiver, the vector sensor, is needed as well as its orientation, which is provided by the heading sensor and the pitch and roll sensor. These sensors effectively create a relative coordinates system referred to the earth. To determine the exact bearing of a detected noise source the orientation of the vector sensor must be precisely known in reference to the orientation of the heading and the pitch and roll sensors. This invention will accomplish this task by incorporating the three sensors onto a common mounting structure for all three sensors.

BRIEF DESCRIPTION OF THE DRAWINGS

A preferred embodiment of the present invention will be set forth in detail with reference to the drawings, in which:

FIG. 1A shows the arrangement of components in an underwater acoustic bearing sensor according to the preferred embodiment;

FIG. 1B shows a sectional view taken along line IB—IB in FIG. 1A; and

DETAILED DESCRIPTION OF THE PREFERRED EMBODIMENT

Figure 2:
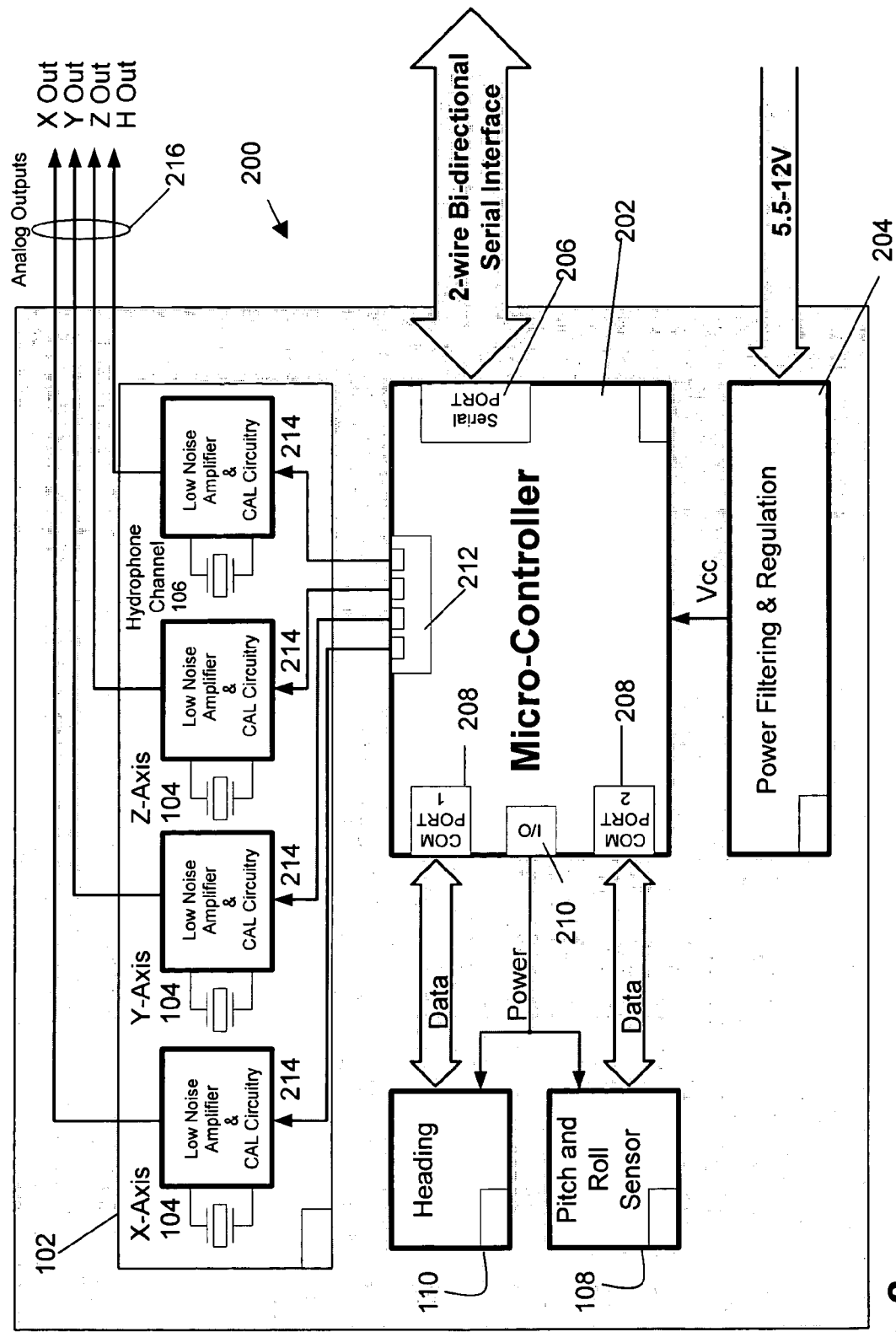
FIG. 2 shows an electrical block diagram of the underwater acoustic bearing sensor of FIG. 1A.

A preferred embodiment of the present invention will be set forth in detail with reference to the drawings, in which like reference numerals refer to like elements throughout.

As shown in FIGS. 1A and 1B, the underwater acoustic bearing sensor 100 of the preferred embodiment includes three distinct sensing elements: 1) a vector sensor 102 (single, dual or tri-axial accelerometer(s) 104 and one hydrophone 106), 2) a pitch and roll sensor 108, and 3) a heading sensor 110, with all items except the hydrophone 106 mounted on the same mounting ring 112.

As explained above, the three coordinate systems need to be collinear in order to minimize bearing error and take full advantage of the directionality of the vector sensor. To do so, the mounting ring 112 has cavities 114, with tightly controlled tolerances, in which the accelerometer sensing elements 104, the pitch and roll sensor 108, and the heading sensor 110 are mounted. The omni-directional hydrophone 106 does not require alignment with the other sensors, since by definition it is direction-insensitive. Mounting all the directional sensing elements allow this collinearity to be done with minimal error (the error being within the assembly and ring manufacturing tolerances). In addition, a calibration is done to offset any assembly misalignment.

The underwater acoustic bearing sensor 100 also includes a case 116 and a printed circuit board 118. The printed circuit board 118 supports circuitry that will be explained below with reference to FIG. 2.

FIG. 2 shows the circuitry 200 of the underwater acoustic bearing sensor 100. The circuitry 200 is centered on a microcontroller 202, which can be any microcontroller sufficiently powerful to carry out the required operations. The microcontroller 202 is powered through a power source 204 for power filtering and regulation. The microcontroller 202 has a serial port 206 for bidirectional communication with a data acquisition system (not shown), communication ports 208 for bidirectional communication with the pitch and roll sensor 108 and the heading sensor 110, an input/output port 210 for providing a power enable signal to the pitch and roll sensor 108 and the heading sensor 110, and ports 212 for providing calibration tones to the vector sensor 102.

In the vector sensor 102, each of the accelerometers 104 and the hydrophone 106 has low-noise amplifier and calibration circuitry 214 for receiving a calibration tone from the microcontroller 202 and for amplifying an output of the corresponding accelerometer 104 or hydrophone 106 to provide an analog output 216.

While a preferred embodiment has been set forth in detail above, those skilled in the art who have reviewed the present disclosure will readily appreciate that other embodiments can be realized within the scope of the present invention. For example, numerical values are illustrative rather than limiting. Moreover, components shown separately can be integrated, and a component shown as integrated can be implemented as multiple components. Therefore, the present invention should be construed as limited only by the appended claims.

We claim:

1. An underwater acoustic bearing sensor comprising:
   a vector sensor having a single, bi-axial, or tri-axial accelerometers and a hydrophone;
   a heading sensor;
   a pitch and roll sensor; and
   a common mounting structure in which the vector sensor, the heading sensor, and the pitch and roll sensor are mounted, the common mounting structure supporting the vector sensor, the heading sensor, and the pitch and roll sensor such that the vector sensor, the heading sensor and the pitch and roll sensor have a common coordinate system, the mounting structure having a mounting ring with cavities formed therein, and the accelerometers, the heading sensor, and the pitch and roll sensor are mounted in the cavities;
   a circuit in electrical communication with the vector sensor, the heading sensor, and the pitch and roll sensor for outputting signals from the vector sensor, the heading sensor, and the pitch and roll sensor to a data acquisition unit external to the underwater acoustic and bearing sensor, the circuit including a microcontroller with ports for communication with the heading sensor and the pitch and roll sensor to receive data from the heading sensor and the pitch and roll sensor, and a port for communicating the data from the heading sensor and the pitch and roll sensor to the data acquisition unit, and
   calibration and amplification circuitry for the vector sensor, and wherein the microcontroller further comprises ports for outputting calibration tones to the calibration and amplification circuitry.

2. The underwater acoustic bearing sensor of claim 1, wherein the microcontroller further comprises a port for providing a power enable signal to the heading sensor and the pitch and roll sensor.

3. The underwater acoustic and bearing sensor of claim 1, further comprising a case, and wherein the hydrophone is mounted in the case separately from the mounting ring.

4. An underwater acoustic bearing sensor comprising:
   a vector sensor having a single, bi-axial, or tri-axial accelerometers and a hydrophone;
   a heading sensor;
   a pitch and roll sensor; and
   a common mounting structure in which the vector sensor, the heading sensor, and the pitch and roll sensor are mounted, the common mounting structure supporting the vector sensor the heading sensor, and the pitch and roll sensor, such that the vector sensor, the heading sensor and the pitch and roll sensor have a common coordinate system, the mounting structure having a mounting ring with cavities formed therein, and the accelerometers, the heading sensor, and the pitch and roll sensor are mounted in the cavities;
   a circuit in electrical communication with the vector sensor, the heading sensor, and the pitch and roll sensor for outputting signals from the vector sensor, the heading sensor, and the pitch and roll sensor to a data acquisition unit external to the underwater acoustic and bearing sensor, the circuit including a microcontroller with ports for communication with the heading sensor and the pitch and roll sensor to receive data from the heading sensor and the pitch and roll sensor, and a port for communicating the data from the heading sensor and the pitch and roll sensor to the data acquisition unit, and
   calibration and amplification circuitry for the vector sensor, and wherein the microcontroller further comprises ports for outputting calibration tones to the calibration and amplification circuitry,
   the circuitry including analog outputs for outputting data signals from the calibration and amplification circuitry to the data acquisition unit.

5. The underwater acoustic and bearing sensor of claim 4, further comprising a case, and wherein the hydrophone is mounted in the case separately from the mounting ring.

6. The underwater acoustic bearing sensor of claim 4, wherein the microcontroller further comprises a port for providing a power enable signal to the heading sensor and the pitch and roll sensor.

* * * * *